J. R. Hamilton,
Corn Sheller.
No. 109,315. Patented Nov. 15, 1870.
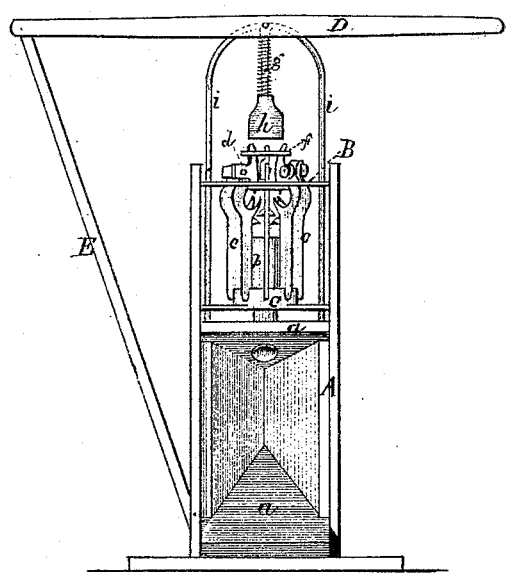
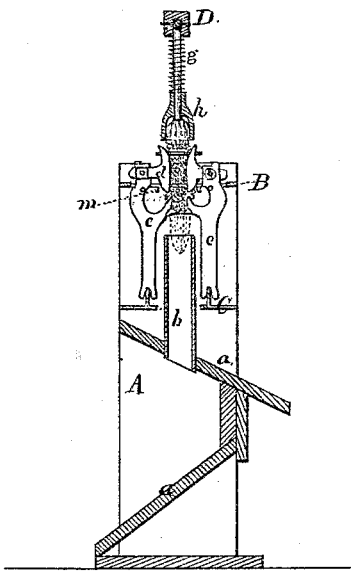
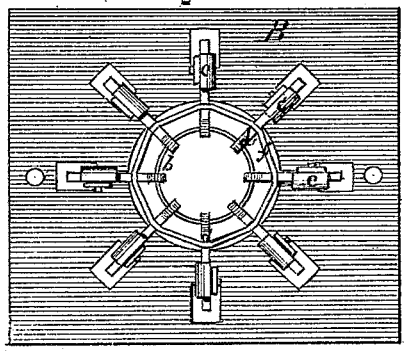
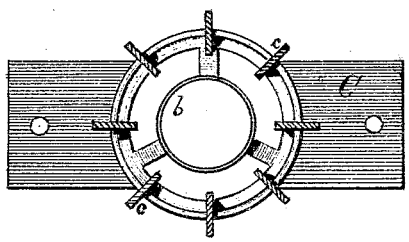
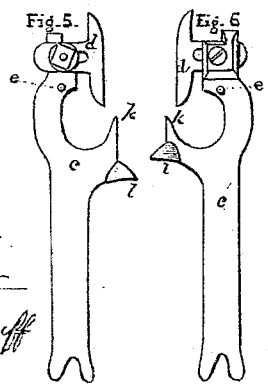
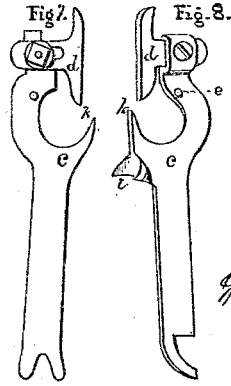
Witnesses
C. H. Poole
E. W. Woodruff
Inventor
J. R. Hamilton
by his attorney
E. W. Woodruff

*J. R. Hamilton,*

*Corn Sheller.*

*No. 109,315.*  *Patented Nov. 15. 1870.*

Witnesses.
E. H. Poole
E. W. Woodruff

Inventor.
J. R. Hamilton
by his attorney
E. W. Woodruff.

UNITED STATES PATENT OFFICE.

JONATHAN R. HAMILTON, OF KINGSTON, MINNESOTA.

IMPROVEMENT IN CORN-SHELLERS.

Specification forming part of Letters Patent No. 109,315, dated November 15, 1870.

*To all whom it may concern:*

Be it known that I, JONATHAN R. HAMILTON, M. D., of Kingston, in the county of Meeker and State of Minnesota, have invented certain new and useful Improvements in Machines or Apparatus for Shelling Dry or Cutting Off Green Corn; and the following is a full, clear, and exact description of the same, reference being had to the accompanying drawing, making a part of this specification, in which—

Figure 9:
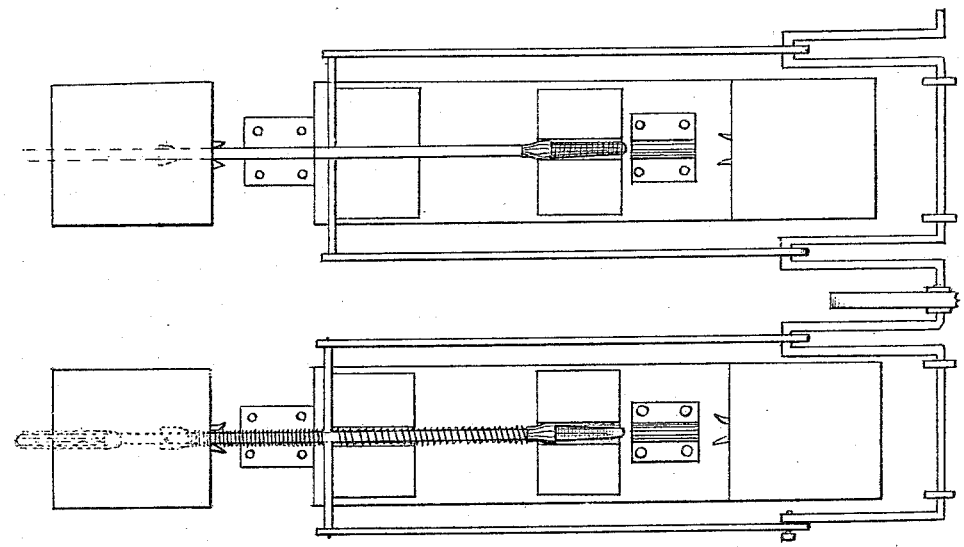
Figure 10:
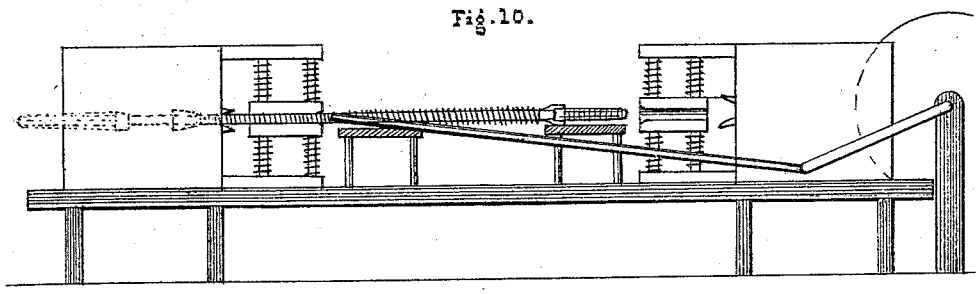

Figure 1 represents a front elevation of a machine embodying my invention. Fig. 2 is a vertical transverse section representing the machine in operation. Fig. 3 is a top view of the upper plate, lifter-bars, and tube. Fig. 4 is a top view of the lower plate, showing the attachment of the tube and lifter-bars. Figs. 5, 6, and 7 are side elevational views of the lifters. Fig. 8 is a quartering view of cutter for green corn. Fig. 9 represents a plan or top view of two double-acting machines arranged in a horizontal position, and operated by a crank-motion. Fig. 10 is a side elevation of the same.

Nature and Objects of the Invention.

The first part of my invention relates to the construction and arrangement of a series of lifters or cutters, provided with adjustable plates, for the purpose of regulating them to suit the size or length of the kernels of corn which are to be removed from the cob.

The second part of my invention relates to the peculiar form and construction of the upper and lower plates, for the purpose of attaching the lifters and tube.

The third part of my invention relates to the driver, provided with movable cup and spiral spring, for forcing the ear of corn between the lifters for the purpose of shelling dry or cutting off green corn.

General Description.

A, Figs. 1 and 2, is the box or frame, to which are attached the parts which comprise the working mechanism. It is made of wood, and is constructed with inclined boards *a a*, to separate the corn from the cobs and discharge them on opposite sides. The upper plate B is of iron. It is constructed, as shown in Fig. 3, with a circular opening in the center, and slots through it radiating from the center, which slots are widened at their outer ends. On the under side, around the hole in the center, the plate is flanged, the object of which will be hereafter explained. The lower plate C, Figs. 1, 2, and 4, is also of iron. It has a circular opening in the center, and at three points, equidistant, projections toward the center, which serve to sustain and hold centrally the tube *b*. There is also a flange projecting upward from its surface, in which are notches, in number and position corresponding to the slots in plate B. These two plates are fastened to the box A by means of bolts. Their use is to afford the means of attaching and holding the lifters *c* in such a manner as that they may be easily removed, when desired.

The lifters *c* are in form various, as shown in detached views, Figs. 5, 6, 7, and 8, the variation or difference being in that part or position which comes in contact with the corn in the operation of shelling or cutting. In Figs. 5, 6, and 7 this part is made pointed at the upper end. In Figs. 5 and 6, at the base or lower end, it is fluked or winged in a curved form, presenting an edge on its upper side on a line with the point. In Fig. 6 the base or lower edge of this wing is on a line with the top edge of the wing of Fig. 5.

In the cutter shown in Fig. 8 the point is made chisel-shaped, and also the curved or winged part has a cutting-edge. This style of point is used for cutting green corn.

At the top end of the lifter-bars are the adjustable plates *d*. They are slotted, and are held in position by means of a bolt, by which means they can be regulated to suit the size of the corn to be shelled or cut. A projecting pin, *e*, on each side of the lifters, which rests against the flange on the under side of plate B, together with the fork at the lower end of the lifter-bar, which fits into the notches in the flange of plate C, keeps them in place, and allows them to open and close at their upper ends when in operation. An elastic rubber ring, *f*, is placed around the top ends of the adjustable plates, which are attached to the lifter-bars, the object being to hold them up too, and allow for the tapering and varying size of ears of corn. The tube *b*, for guiding the direction of the cob in the operation of shelling or cutting, is made of sheet metal. It is secured to plate C in the manner described, its upper end coming immediately under the lifter-points, the lower passing through the inclined board, which also aids in holding it. The driver $g$, provided with the cup $h$ and a spiral spring, is attached to the sliding parallel bars $i\ i$. These are made of a bar of round iron, bent into a semicircular shape in the middle, to which the driver $g$ is welded. Holes are made in the plates B and C, and also through the inclined boards in which the bars slide, giving the direction to the driver in the operation of forcing the ear of corn. The cup $h$ is made to slide upon the driver $g$, the end of which is riveted or enlarged to prevent its coming off, the spiral spring exerting a pressure tending to hold it toward the end, yet allowing it to slide upward when in operation. Motion is communicated to the driver by means of the hand-lever D, which is pivoted to the fulcrum-bar E, which bar is attached to the box A in such a manner as to allow the required motion.

It will be seen that the lifters are so arranged as to be opposite each other in pairs, (two of each kind, as shown in Figs. 5, 6, and 7, constitute a pair,) thus allowing them to come together, bringing the points so as to describe a circle, small or large, according to the size of the cob passing through them.

The object of the semicircular-shaped base or winged part of the lifter or cutter is to remove the remaining kernels which might possibly escape the points.

The operation of shelling or cutting is performed by placing one end of the ear of corn in the mouth of the lifters or cutters, bringing the driver down onto the other, when the cup will inclose it. Power then being applied to the lever, the ear is forced between the lifters or cutters, thus removing the corn from the cob, which falls outside of the tube. When the cup reaches the points of the lifters it is stopped by them. The spiral spring, yielding, allows the driver to pass between them, thus forcing the cob through into the tube, the upper inclined board conveying the corn in one direction, while the lower discharges the cob in another.

I contemplate using a double machine, or a series of them, in a horizontal position, and operating them by means of a crank movement, as shown in Figs. 9 and 10, second sheet.

I claim as my invention—

1. The lifters $c$, provided with points $k$ and $l$, in combination with the adjustable plates $d$, when constructed and arranged substantially as shown and described, for the purposes set forth.

2. The combination of the plates B and C, constructed substantially as shown, with the lifters $c$ and tube $b$, when arranged as shown, and for the purposes specified.

3. The combination of the lifters $c$ and adjustable plate $d$ with the rubber band $f$, pins $e$, and flange $m$, when all constructed and operating as shown, for the purpose set forth.

4. The combination of the lever D with the driver $g$, cup $h$, lifters $c$, and tube $b$, all constructed and arranged as shown, for the purpose set forth.

5. The arrangement of the lifters or cutters $c$ and $c'$, placed opposite each other in pairs, so that the lower surface of the short lifters $c'$ will be above the upper surface of the long lifter $c$, constructed substantially as shown, for the purpose specified.

In testimony whereof I hereunto set my hand this 22d day of September, 1870.

J. R. HAMILTON, M. D.

Witnesses:
 LLOYD DORSEY,
 E. W. WOODRUFF.